(12) United States Patent
Licht et al.

(10) Patent No.: US 11,406,854 B2
(45) Date of Patent: *Aug. 9, 2022

(54) SYSTEM, APPARATUS AND METHOD FOR ARRESTING PROPAGATION OF A DEFLAGRATION IN A CLEAN AIR RETURN DUCT OF AN AIR-MATERIAL SEPARATOR

(71) Applicant: CV Technology, Inc., Jupiter, FL (US)

(72) Inventors: Nicholas P. Licht, Wellington, FL (US); Jason R. Krbec, Jupiter, FL (US); Robert V. Cudnik, Jr., Palm Beach Gardens, FL (US); Martin J. Cvetas, North Palm Beach, FL (US)

( * ) Notice: Subject to any disclaimer, the term of this patent is extended or adjusted under 35 U.S.C. 154(b) by 32 days.

This patent is subject to a terminal disclaimer.

(21) Appl. No.: 17/086,430

(22) Filed: Nov. 1, 2020

(65) Prior Publication Data

US 2021/0046343 A1 Feb. 18, 2021

Related U.S. Application Data

(63) Continuation of application No. 16/139,614, filed on Sep. 24, 2018, now Pat. No. 11,185,727, which is a continuation of application No. 15/706,163, filed on Sep. 15, 2017, now abandoned.

(60) Provisional application No. 62/395,562, filed on Sep. 16, 2016.

(51) Int. Cl.
| | |
|---|---|
| *A62C 4/00* | (2006.01) |
| *B32B 33/00* | (2006.01) |
| *A62C 35/00* | (2006.01) |
| *A62C 99/00* | (2010.01) |
| *A62C 3/04* | (2006.01) |
| *B04C 9/00* | (2006.01) |

(52) U.S. Cl.
CPC ............... *A62C 4/00* (2013.01); *A62C 35/00* (2013.01); *A62C 99/009* (2013.01); *B32B 33/00* (2013.01); *A62C 3/04* (2013.01); *B04C 9/00* (2013.01)

(58) Field of Classification Search
CPC ......... A62C 4/00; A62C 35/00; A62C 99/009; A62C 3/04; B04C 9/00; B32B 33/00
USPC ............. 169/48, 49, 23, 54, 56; 222/189.01; 431/346; 220/88.1, 88.2; 48/192
See application file for complete search history.

(56) References Cited

U.S. PATENT DOCUMENTS

| | | | | |
|---|---|---|---|---|
| 2,277,294 | A * | 3/1942 | Brooks | ............ A62C 4/00 48/192 |
| 4,909,730 | A * | 3/1990 | Roussakis | ........... F23D 14/82 431/346 |
| 6,216,791 | B1 * | 4/2001 | Alhamad | ............ B65D 81/02 169/48 |
| 6,699,035 | B2 * | 3/2004 | Brooker | ............ A62C 4/02 222/189.01 |

(Continued)

*Primary Examiner* — Steven J Ganey
(74) *Attorney, Agent, or Firm* — Shutts & Bowen LLP

(57) ABSTRACT

Disclosed herein are a system, method, and apparatus for arresting flames in an air return line. The apparatus includes a flame barrier containing one or more metal mesh layers and configured to permit airflow there through while preventing flame break-through. The flame barrier can also have or be connected to one or more temperature or pressure sensors configured to detect blockage of airflow through the flame barrier and to detect damage to the flame barrier. The apparatus can also include additional temperature or pressure sensors for detecting the propagation of deflagration in the air return line.

7 Claims, 3 Drawing Sheets

(56) References Cited

U.S. PATENT DOCUMENTS 8,834,153 B2 * 9/2014 Helmsen ................ A62C 4/02
169/48
11,185,727 B2 * 11/2021 Licht ....................... A62C 4/00

* cited by examiner

SYSTEM, APPARATUS AND METHOD FOR ARRESTING PROPAGATION OF A DEFLAGRATION IN A CLEAN AIR RETURN DUCT OF AN AIR-MATERIAL SEPARATOR

CROSS-REFERENCE TO RELATED APPLICATIONS

This application is a Continuation of U.S. patent application Ser. No. 16/139,614, filed Sep. 24, 2018, which is a Continuation of U.S. patent application Ser. No. 15/706,163, filed Sep. 15, 2017, which claims priority to U.S. Provisional Patent Application No. 62/395,562, filed Sep. 16, 2016, the entirety of each which is incorporated herein by reference.

BACKGROUND

The accumulation of combustible dust during the production of powder bulk solids creates a substantial risk of flash-fire and explosion (a "combustible dust event" or "dust deflagration"). Though the issue of combustible dust has been known for a long time, the study and prevention of combustible dust events is often overlooked and unacknowledged. NFPA 652 entitled "Standard on the Fundamentals of Combustible Dust" is a national standard published by the National Fire Protection Association (hereinafter "NFPA 652"). NFPA 652 defines combustible dust as a finely divided combustible particulate solid that presents a flash-fire hazard or explosion hazard when suspended in air or the process-specific oxidizing medium over a range of concentrations Recently, the NFPA revised its standards to require that clean air exhaust lines from air-material separators (dust collectors/filter receivers/etc.) must include explosion isolation devices unless they are directed outdoors to a safe location away from people. This new requirement is creating a challenge for customers since current explosion protection equipment for combustible dust is expensive, and installing additional isolation devices on process equipment can greatly increase the total price of a project.

Although explosion isolation products currently exist for combustible dust applications (including pinch valves, knife gate valves, chemical blockers and flap valves), they are principally designed for applications in which material (dust) must flow through the devices under normal operating conditions. Accordingly, such devices are complex and expensive, and are generally and economically unsuitable for application in clean air return lines. In addition, exhausting previously conditioned (cooled or heated) air to the environment rather than returning the conditioned air to a facility results in substantial energy losses and increases a facility's carbon footprint.

As a result, combustible dust facilities are presently struggling with the decision whether to add large capital expenses to their budgets to protect the clean air exhaust lines which return conditioned air back into the facilities, or to avoid such capital expenses and endure higher energy costs year after year by exhausting previously conditioned and cleaned air to the atmosphere. Accordingly, there is a need for a simple and economical device which provides explosion isolation for clean air exhaust lines in combustible dust facilities. Moreover, there is a need for an explosion isolation device which is reliable, can be applied to a wide range of applications, is easy to install, has a low long term operating cost, and is simple to maintain. In addition, such an explosion isolation device should be designed to be certifiable under NFPA 69-Standard on Explosion Prevention Systems.

DETAILED DESCRIPTION

Figure 1:
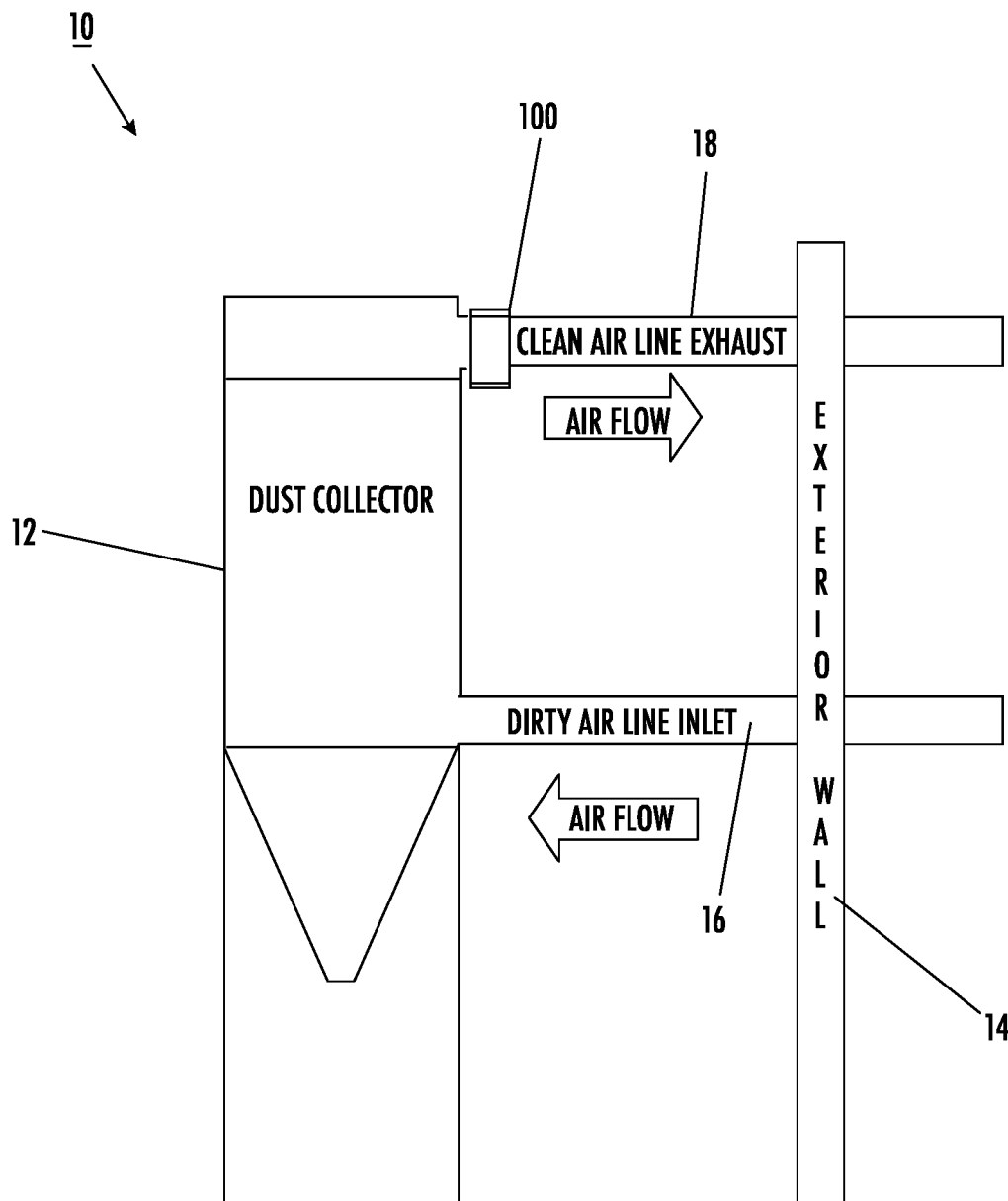
FIG. 1 is a schematic diagram of a dust collection system including a flame arrester according to the invention installed in a clean air return line.

The invention is directed to a device, system and method for preventing a dust deflagration initiated in an air-material separator from entering a facility through a clean air return line. As shown in FIG. 1, a facility 10 may include a typical air-material separator 12 located outside an exterior wall 14. Alternatively, the air-material separator 12 may be located inside the exterior wall 14 (not shown in FIG. 1). A dirty air line 16 directs combustible dust suspended in air ("dirty air") from the facility 10 to the air-material separator 12. Once the air-material separator 12 separates the dust from the dirty air, cleaned air is exhausted from the air-material separator 12 and is directed into the facility through a clean air line 18. This cycle is repeated such that dirty air from the facility 10 is continually cleaned by the air-material separator 12. A flame arrestor 100 according to the invention is provided in the clean air line 18. The flame arrestor can be located at different points in the clean air line 18, including proximate to the air-material separator 12, proximate to the facility 10, or at any point in-between. If a deflagration initiates within the air-material separator 12, the flame arrestor 100 is designed to block propagation of the flame through the clean air line 18, and thereby prevent the deflagration from entering the facility 10 through the clean air line 18.

Figure 2:
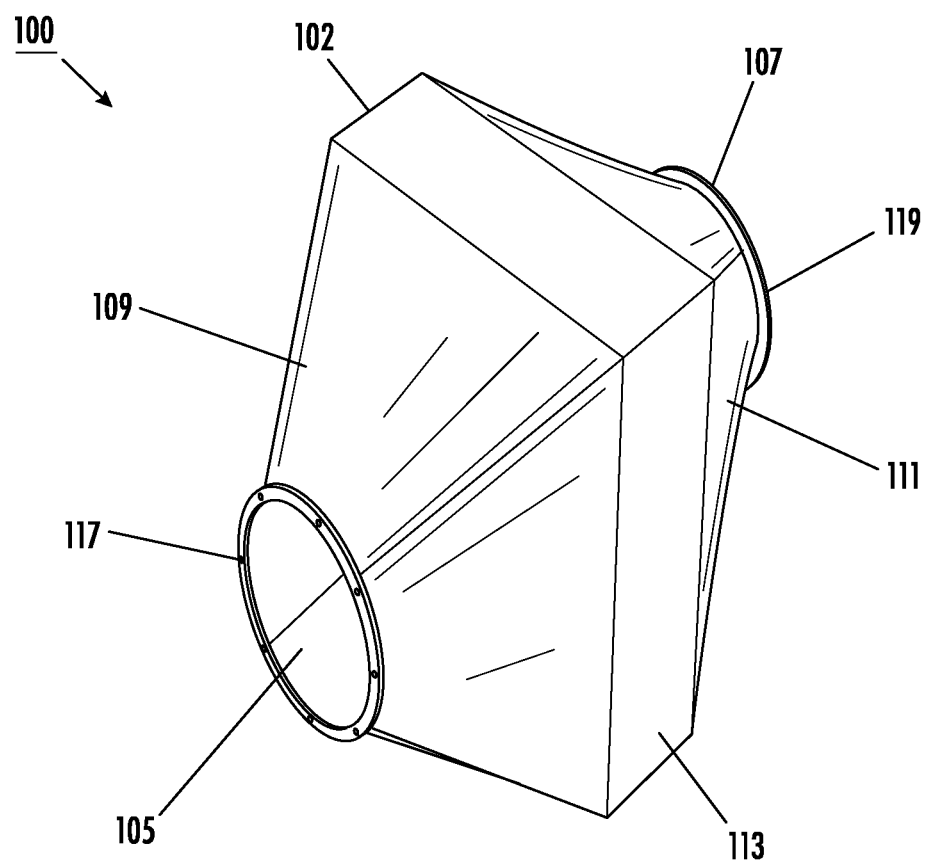
FIG. 2 is a perspective view of one embodiment of a flame arrestor according to the invention.
Figure 3:
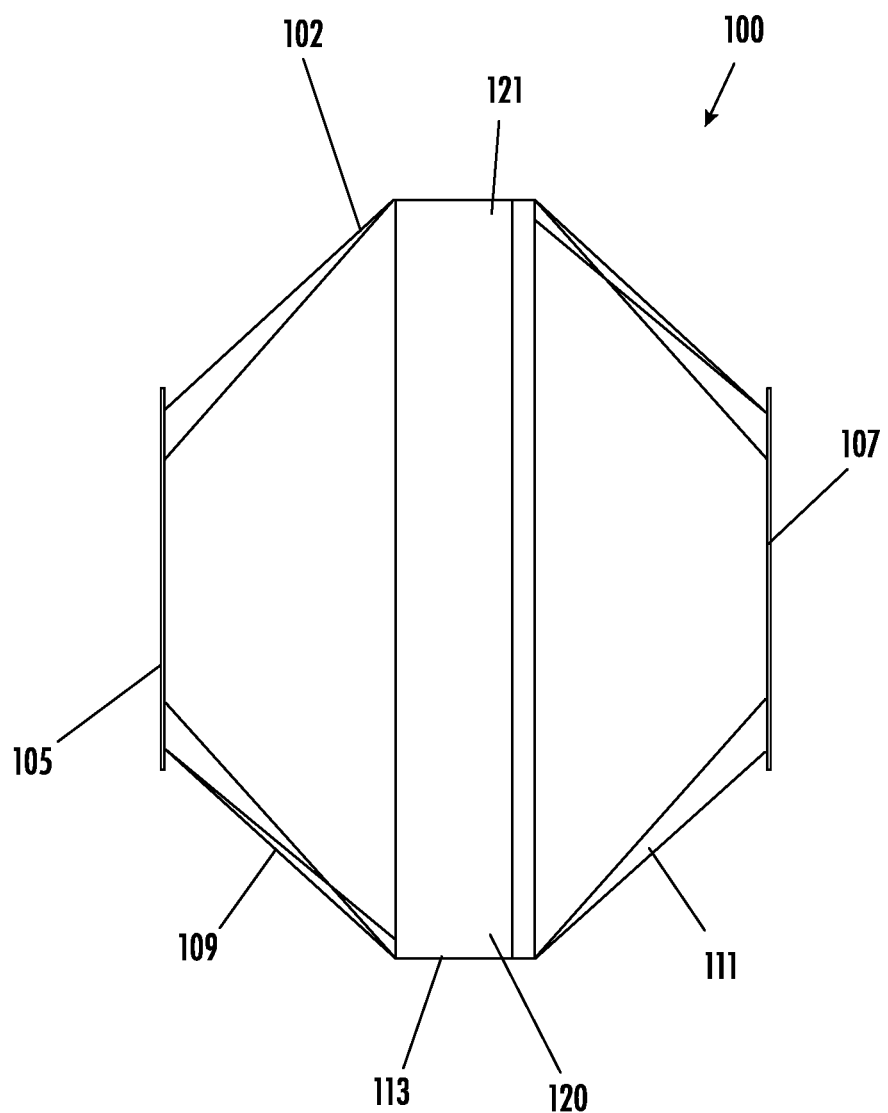
FIG. 3 is a longitudinal sectional view of the flame arrestor shown in FIG. 2.

One embodiment of a flame arrestor 100 according to the invention is shown in FIGS. 2 and 3. In this embodiment, the flame arrestor 100 includes a housing 102 having an inlet 105 and an outlet 107. In the embodiment shown in FIGS. 2 and 3, the inlet 105 and the outlet 107 are both circular and have equal diameters. Alternatively, the inlet 105 and outlet 107 can have any other shape which is compatible with installation in a clean air return line having a particular cross-sectional shape, such as square or rectangular, for example. The housing 102 also includes a central portion 113 which is substantially larger in diameter than the inlet 105 and the outlet 107. In the embodiment shown, the central portion 113 has a generally square cross-sectional shape, and has a width which is more than twice the diameter of the inlet 105 and the outlet 107. The central portion 113 can have other alternative cross-sectional shapes and sizes. A first transition portion 109 of the housing 102 extends between the inlet 105 and the central portion 113, and a second transition portion 111 extends from the central portion 113 to the outlet 107. The first transition portion 109, the central portion 113, and the second transition portion 111 combine to form a continuous shell capable of containing and directing a flow of air through the housing 102 from the inlet 105 to the outlet 107. Flanges 117, 119 can be provided on each end of the housing 102 for use in connecting the flame arrestor 102 to adjoining sections of a clean air return line.

As shown in FIG. 3, the flame arrestor 100 includes a flame barrier 120 disposed within the housing 102. In this embodiment, the flame barrier 120 is positioned within the central portion 113 of the housing 102. In one embodiment, the flame barrier 120 includes a plurality of metal mesh layers 121 stacked together along its depth. Each metal mesh layer 121 includes a plurality of openings (not shown) which extend through the layer 121 and permit air to pass through the layer 121. In one embodiment, each metal mesh layer 121 is stainless steel, though other types of metal also may be used. Alternatively, the metal mesh layers 121 may be constructed of two or more various types of metals combined together in a single stack to form the flame barrier 120.

The number of metal mesh layers 121 and the percentage of open area of the metal mesh layers 121 can be varied to provide the flame barrier 120 with desired properties and capabilities. In particular, the flame barrier 120 can be configured to permit clean air exhaust to flow through the flame arrestor 100 with a minimal pressure drop. In one embodiment, the flame barrier 120 is configured to provide a pressure drop from about 0.2 bar to about 0.5 bar. In addition, the number of metal mesh layers 121 should be sufficient to quench a flame propagation while still allowing air to flow through the flame arrestor 100 during the deflagration such that there is no excessive buildup of back pressure in the flame arrestor 100 during such an event. Accordingly, the number and quality of the metal mesh layers 121 is balanced between a sufficient number of layers to halt propagation of a flame and a minimal number of layers 121 to facilitate air flow. The metal mesh layers 121 form both a choke point for a deflagration and a heat sink which breaks down the deflagration and ceases combustion via the dispersion of heat. The flame barrier 120 is designed to prevent flame-break through, and also to prevent any un-burnt dust which may enter the line during the deflagration from passing through the flame arrestor 100.

The housing 102 is designed to withstand high internal pressures anticipated during a deflagration, while also maintaining support of the flame barrier 120. In one embodiment, the housing 102 is configured to withstand an internal pressure of at least about 1.0 bar. The housing 102 can be constructed of sheet metal or any other suitable material. The housing 102 can include a door or access hatch to permit the flame barrier 120 to be replaced, if needed, and to permit periodic inspections of the interior of the flame arrestor 100. In addition, a HEPA filter cartridge may be mounted within the housing 102 to eliminate the need for a separate HEPA filter for the returned clean air, and to act as a silencer for the dust collection system.

The flame arrestor 100 is designed to anticipate potential problems that end users of the device 100 might encounter. For example, it is desirable that the flame arrestor 100 is designed such that it is very difficult or impossible for a typical user of the device 100 to install the device incorrectly in a clean air return line 18. For example, the flame arrestor 100 shown in FIGS. 2 and 3 may be symmetrical such that the device 100 can be installed in opposite directions and still perform identically. In other words, the flame arrestor 100 can be symmetrically designed such that the device 100 functions in substantially the same way when the inlet 105 receives clean exhaust air from the air-material separator 12 as when the "outlet" 107 receives clean exhaust air from the air-material separator 12. Other methods and configurations may also be used to make incorrect or inadequate installation of the flame arrestor 100 difficult or impossible.

In addition, the flame arrestor 100 can include one or more signaling devices to alert customers of problems and/or to comply with NFPA standards. For example, in the event that a deflagration does occur, the device can be configured to detect the occurrence, and to communicate the detected occurrence to a user. In one embodiment, the flame arrestor 100 includes one or more temperature sensors, one or more pressure sensors, or a combination of one or more temperature sensors and one or more pressure sensors capable of detecting conditions consistent with the occurrence of a deflagration event. In addition, the flame arrestor 100 can be configured to signal that the flame blocker 120 has been compromised, and/or that the flame blocker 120 has not been compromised. For example, the flame barrier 120 may include a fusible link that would break under the heat and pressure of a deflagration and activate a single pole double throw relay configured to alert a user to an alarm status. Furthermore, the flame arrestor 100 can be configured to alert a user that the device has become sufficiently blocked or clogged by dust or other contaminants such that the device 100 may not function properly. For example, one or more pressure sensors may be provided to detect any substantial change in the pressure drop across the flame barrier 120 as clean return air flows through the flame arrestor 100. In one embodiment, a Magnehelic® differential pressure gauge can be used to measure pressure differentials and detect if the flame barrier has been plugged. The Magnehelic® gauge could be configured to trip a single pole double throw relay in the event the pressure differential becomes too large across the upstream and downstream portions of the arrestor 100. All such signaling devices should be rated for Class 2 Division 2 areas at a minimum, and preferably Class 2 Division 1. These sensors can be connected to one or more electronic alarm or communication systems which is/are configured to alert or notify a user when a deflagration event or problem occurs.

The above descriptions of the invention are intended to disclose particular aspects and features of various embodiments of the invention. A person of ordinary skill in the art understands that certain changes or modifications can be made to the described embodiments without departing from the scope of the invention. All such changes and modifications are intended to be within the scope of this disclosure and any claim appended hereto.

What is claimed is:

1. A flame arrestor comprising:
   housing comprising an inlet, an outlet and a central portion, wherein the central portion is wider than the inlet and the outlet;
   a removable flame barrier disposed within the central portion of the housing, the flame barrier comprising a stack of a number of substantially planar metal mesh layers configured to permit a flow of air therethrough when inserted into the central portion of the housing; and
   one or more sensors configured to detect damage to the removable flame barrier, wherein the one or more sensors comprise a fusible link configured to break responsive to heat and pressure.

2. The flame arrestor of claim 1, wherein the mesh layers are formed from stainless steel.

3. The flame arrestor of claim 1, wherein the mesh layers are formed from two or more different types of metals combined together in a single stack.

4. The flame arrestor of claim 1, wherein the number of layers balances requisite air flow with flame propagation.

5. The flame arrestor of claim 1, wherein the housing is configured to withstand an internal pressure of one bar.

6. The flame arrestor of claim 1, wherein the fusible link configured to break responsive to heat and pressure is coupled to a single, pole double throw relay configured to alert a user to an alarm status.

7. The flame arrestor of claim 1, further comprising:
- an access hatch included with the housing, the access hatch permitting access to the removable flame barrier allowing the removable flame barrier to be removed from the central portion.

\* \* \* \* \*